METHOD OF HEAT TREATING THIN MAGNETIC FILMS IN A TRANSVERSE MAGNETIC FIELD

Filed April 29, 1965 2 Sheets-Sheet 1

INVENTORS
STANLEY B. GREENBERG
EDWARD KOROSTOFF
BY
[signatures]
ATTORNEYS

INVENTORS
STANLEY B. GREENBERG
EDWARD KOROSTOFF
BY
ATTORNEYS

United States Patent Office 3,409,479
Patented Nov. 5, 1968

3,409,479

METHOD OF HEAT TREATING THIN MAGNETIC FILMS IN A TRANSVERSE MAGNETIC FIELD

Stanley B. Greenberg and Edward Korostoff, Philadelphia, Pa., assignors, by direct and mesne assignments, to the United States of America as represented by the Secretary of the Navy Filed Apr. 29, 1965, Ser. No. 452,035
4 Claims. (Cl. 148—103)

ABSTRACT OF THE DISCLOSURE

A process for treating a thin ferromagnetic film made of nickel and iron and having a remanent magnetization lying along a certain magnetic axis in order to lower the anisotropy field ($H_k$) thereof which process includes annealing the film in an environment of 97.5% argon and 2.5% hydrogen at a temperature in the range of 250° C. to 350° C. for a time period of 5 to 15 minutes while subjecting the film to a transverse magnetic field of a size such as 35 oersteds to saturate the magnetic material in the transverse direction and thereafter quenching the film to room temperature.

The present invention relates to a process for treating thin ferromagnetic films such as those suitable for use as storage or switching elements in digital computing apparatus, and more particularly to a process for lowering the anisotropy field ($H_k$), a magnetic property of the film.

Thin, uniaxial, magnetic films of perallоy (81% nickel, 19% iron) and 500 to 3000 angstroms in thickness exhibit significant potential, because of their capability for fast switching, for data processing applications. This is particularly true in digital computer information storage memories. These films require only a few nanoseconds to switch in the pure rotational mode. In comparison, ferrite cores, used in present computer memories, switch by domain wall motion and require at least several hundred nanoseconds to do so. Thin films, therefore, offer an improvement in switching speed of at least two orders of magnitude.

Thin magnetic films are usually made by evaporating a suitable ferromagnetic alloy in a vacuum and condensing the evaporation products on a substrate under the influence of an orienting magnetic field. The resulting film exhibits magnetic anisotropy with respect to an axis perpendicular to the plane of the film. The direction along which the orienting field is applied during the deposition process becomes the longitudinal, preferred or "easy" axis of magnetization along which the magnetization tends to lie in one of two directions and is as illustrated in FIG. 1 by the vectors M and $M_1$ while the direction in the plane of the film orthogonal to the easy direction becomes the so-called transverse or "hard" axis.

The state of the film, i.e., "1" or "0," is usually read out by applying a pulsed magnetic field along the transverse axis. The external field causes the magnetization to rotate as viewed in FIG. 1 from M to $M_2$ in a counterclockwise manner or from $M_1$ to $M_2$ in a clockwise manner. The rotation from $M_1$ to $M_2$ will induce a signal equal but opposite in sign to that induced by the rotation from M to $M_2$ in a sense line (not shown) around or over the film. Information can be written into the film by applying an external magnetic write field in direction M or $M_1$ just as the read field is removed. The magnetization will then return to either M or $M_1$ depending on the direction of the write field.

The minimum read field that will rotate the magnetization to the position $M_2$ is known as the anisotropy filed $H_k$. Therefore, the minimum current pulses needed for reading or writing will depend on the value of $H_k$. The current required to drive a film is several hundred milliamperes at the present state of the art and such currents cannot be obtained at present from thin film or other microminiaturized driving circuitry.

As indicated above, the current required to drive or switch a film is proportional to the anisotropy field ($H_k$) of the film. Until now, the smallest magnitude of $H_k$ obtainable for permalloy films was approximately 2.0 to 2.5 oersteds. In the present invention the value of $H_k$ is reduced to approximately less than 1.0 oersteds which thereby allows the driving current to be reduced to less than 200 milliamperes. A significant reduction of $H_k$ has been accomplished in the past by variation and better control of the numerous parameters involved in the deposition process, such as rate of evaporation or temperature of substrate. Recently films with an $H_k$ equal to approximately 1.0 oersted have been produced by electrochemical deposition. However, because these films contain four components in the alloy, the problems of controlling the desired composition are substantially increased.

It has been observed that annealing a thin magnetic film in a magnetic field along the transverse axis causes a reduction in $H_k$. However, the methods or processes used failed to reduce the value of $H_k$ below 2.0 oersteds. Additionally, annealing in the transverse field at elevated temperatures resulted in an increase in the angular dispersion of the easy axis. (In practice, a film does not have a single "easy" axis, but each small area has its own easy axis pointing in a different direction. The angle within which the easy axes of 90 percent of the film area are contained is known as the angle of dispersion—$\alpha_{90}$. The angle is measured from the "easy" axis). When the angular dispersion becomes significant, the film cannot be used in a memory. Also, when improper combinations of time and temperature of anneal are utilized, the "easy" axis rotated through an angle of 90° in the plane of the film.

It is an object of the present invention to provide a relatively simple and inexpensive process of obtaining low power, thin magnetic film.

A further object of the present invention is to provide a process for reducing the anisotropy field ($H_k$) of thin uniaxial magnetic film of permalloy to less than 1.0 oersted.

A still further object of the present invention is to provide a process for reducing the anisotropy field ($H_k$) of thin magnetic film without substantially and seriously increasing the angular dispersion of the "easy" axis.

A still further object of the present invention is to provide a process for reducing the current needed for reading information out of, writing information into, or switching a thin magnetic field when it is used for information storage or as a logic device in digital computer.

Various other objects and advantages will appear from the following description of an embodiment of the invention and the novel features will be particularly pointed out hereinafter in connection with the appended claims.

Figure 4A:
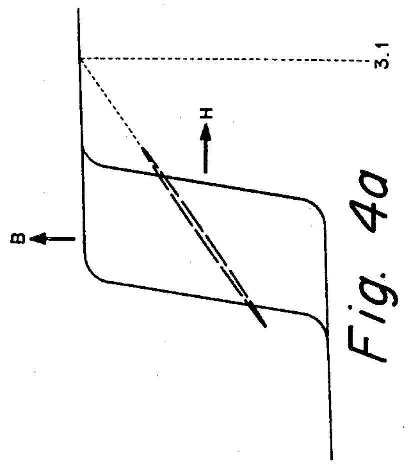
Figure 4B:
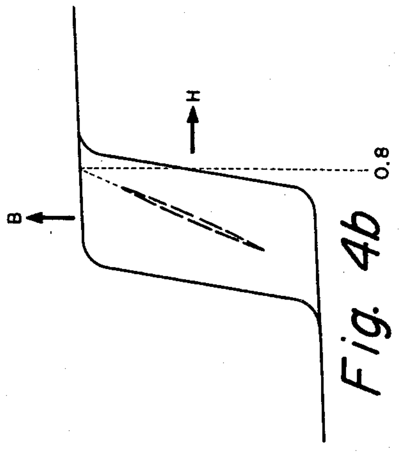

FIG. 4*a* shows the shape of the hysteresis loop of a ferro-magnetic element before the specimen is annealed, and FIG. 4*b* shows the shape of the hysteresis loop of the same element after annealing.

Figures 1, 2:
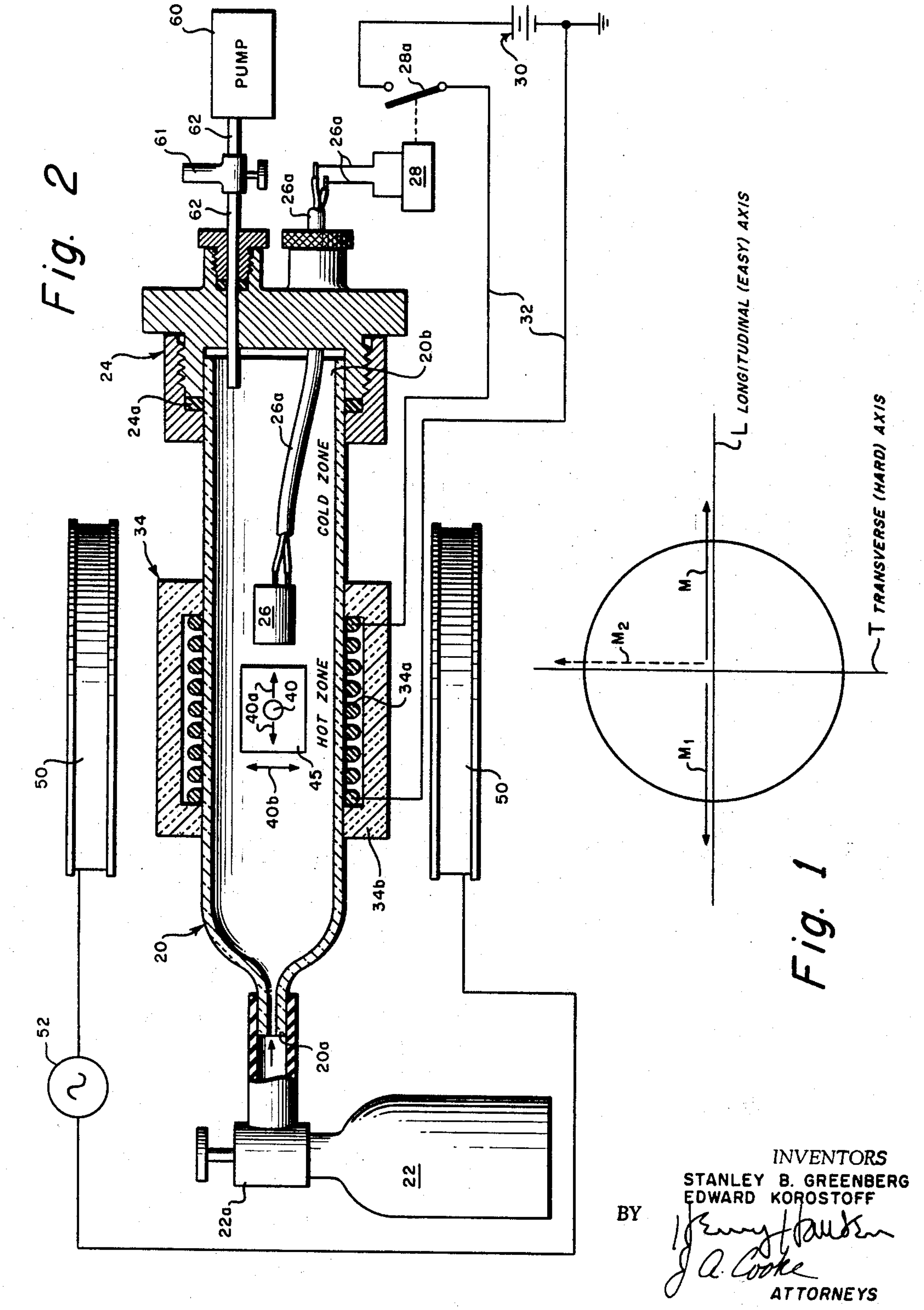
FIG. 1 is a diagrammatic representation of a film-memory cell showing the positions of magnetization vectors.
FIG. 2 illustrates diagrammatically the apparatus used in the inventive process.

The thin magnetic film 10 typified by FIG. 1 is used for information storage in digital computer memories and is made by an evaporating process to be more fully described below. The film develops a longitudinal or "easy" axis L along which the magnetization tends to lie (in the absence of an external magnetic field) in one of two directions as illustrated by the vectors M and $M_1$. The axis in the plane of the film perpendicular to the "easy" axis is the transverse or "hard" axis T. As indicated above, the state of the film, i.e., "1" or "0," is usually read out by applying a pulsed magnetic field along the transverse axis. This external field causes the magnetization to rotate from M to $M_2$ in a counterclockwise manner or from $M_1$ to $M_2$ in a clockwise manner. The rotation from $M_1$ to $M_2$ will induce a signal equal but opposite in sign to that induced by the rotation from M to $M_2$ in a sense line, not shown, around or over the film. Information is written into the film by applying an external magnetic write field through a write line in direction M or $M_1$ just as the read field is removed. The magnetization will then return to either M or $M_1$ depending on the direction of the write field.

The film may be produced by a standard vapor deposition technique such as that described by M. S. Blois, Jr., Journal of Applied Physics, vol. 26, page 975 (1955) and not forming part of the present invention. This evaporation system produces vacuums in the $10^{-9}$ torr range with the substrate heater off, and in the $10^{-8}$ torr range with the substrate heater on. The ultra high vacuum may be produced by an Ultek ion pump and BoostiVac unit. A tungsten wire substrate heater is used with an ion-constantan thermocouple cemented to a monitor slide as the sensor for a temperature controller. The substrates rest on an 0.25-inch-thick copper mask, in which countersunk holes are drilled to minimize vapor shadowing. A 1-by-3-inch resistance-heated tungsten strip is again used to hold the evaporant, which consists primarily of permalloy wire or a mixture of nickel wire and iron wire in the ratio of 83-to-17. The orienting field is produced by a pair of 40-by-20-inch rectangular coils, which gives a 30-oersted field, and the power supply for the coils is current-regulated. A rate monitor similar to that described by G. R. Giedd and M. H. Perkins, in Review of Scientific Instruments, vol. 31, page 773 (1960) is used in conjunction with manual control to maintain an evaporation of 30 angstroms per second.

The substrates may be Arthur H. Thomas microscope slides cut into 1-by-1-inch squares, or Thomas microscope cover glass. A method of substrate cleaning for obtaining a smooth surface includes the following steps: (1) chalk polish under running tap water; (2) rinse in tap water; (3) rinse in Super NZL detergent and water; (4) rinse in tap water; and (5) rinse in distilled water.

Referring now to FIG. 2 for a description of the annealing process, there is shown a container 20 made of non-magnetic material such as glass, and may be, for example, a Vycor tube known and used in the art. A tapered end 20*a* is provided for connection with a source of non-oxidizing substance 22 which may be, for example, a reducing agent such as argon-hydrogen gas. This source of gas is connected to the container 20 through a valve 22*a*. The other end 20*b* of the tube 20 is closed by a commercially available screw cap assembly generally indicated at 24 and sealed by an O-ring 24*a*. A suitable temperature sensing element or temperature monitoring device 26 such as an ion-constantan thermocouple is located within the central portion of the tube 20 and is electrically connected through lines 26*a* passing through cap 24 to a temperature control unit 28 which causes a switch contact 28*a* to open or close depending on the temperature recorded by the sensing element 26. The switch 28*a*, when closed, allows current to flow from a potential source 30 through line 32 to the coils 34*a* of a heating assembly generally illustrated at 34.

Heating assembly 34 surrounds the center section of the glass tube 20 and may be of the cylindrical resistance type capable of substantially raising the temperature inside the tube and includes a cover member 34*b* of insulating material such as Fiberglas or the like, enclosing the heating coils 34*a*. Any deviation of the temperature from a preset value causes the switch 28*a* to open and close depending on the direction of the temperature change.

A sample of magnetic material 40 to be annealed and of the type obtained through the process described below is located with the substrate 45 within the controlled environment of the tube 20. This material 40 is placed in a horizontal plane having the longitudinal or "easy" axis of magnetization indicated by vector 40*a* in a horizontal direction. A constant magnetic field is provided by a pair of coils 50 which straddle the tube 20 and provides a relatively strong magnetic field along the transverse axis of the film as indicated by vector 40*b*. This field is orthogonal to the preferred direction of magnetization. A pair of Helmholtz coils, known and used in the art, may be used to produce the desired field and an alternating current source 52 provides the excitation source for the coil. The coil 50 is supplied with sufficient current to completely saturate the magnetic material 40 in the transverse direction and it has been found that a field of 35 oersteds is sufficient to insure this complete saturation. However, limitation to this field strength is not intended.

In order to vacate the chamber 20 of any gas contained therein prior to the annealing process, a pump 60 including a commercial type T-valve 61 is connected through cap assembly 24 to the interior of the chamber 20.

Figure 3:
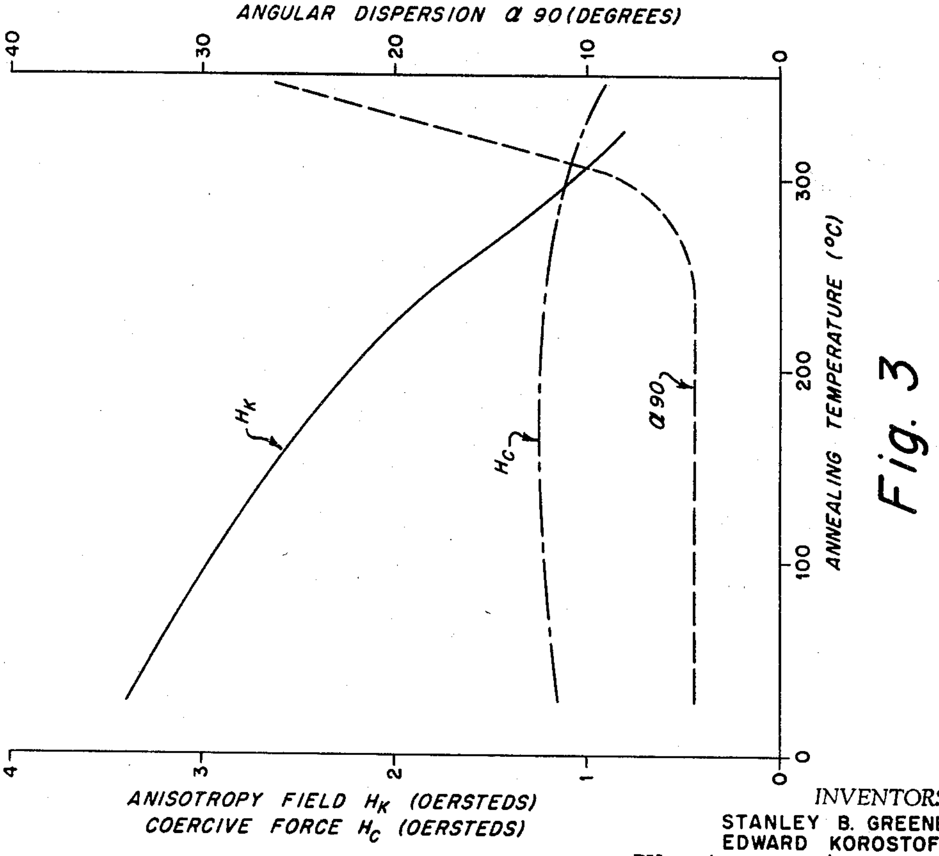
FIG. 3 is a curve illustrating changes produced in magnetic parameters by annealing along the transverse axis by the inventive process.

The changes produced in magnetic parameters by annealing along the transverse axis is illustrated in FIG. 3 which is a typical set of curves for a film deposited at 300° C. In addition to the parameters $H_k$ and $\alpha_{90}$ discussed above, a parameter $H_c$ is illustrated. In viewing the B-H hysteresis loop measured along the longitudinal axis, the H-axis intercept of the unsaturated longitudinal axis loop is termed $H_c$ and is known as the coercive force. This force represents the reversed magnetic intensity needed to reduce the flux density to zero after the specimen has been magnetized to saturation in the opposite direction. These curves were obtained by annealing a film at successively higher temperatures, with a 25-oersted external field along the transverse axis. At each temperature the film was annealed for 10 minutes. The film was quickly cooled after each anneal, and the magnetic properties measured. From FIG. 3 it can be seen that annealing a transverse field caused a substantial reduction in $H_k$, a little change in $H_c$, and a little change in the angular dispersion $\alpha_{90}$, until a temperature over 300° was reached, above which the dispersion rapidly increased. However, this increase is not as dependent on temperature as it appears, but is a result of either locking of the easy axis or formation of labyrinth domains that occur when a film becomes "inverted," i.e., $H_k$ is less than $H_c$.

It was found that the lowest value of $H_k$ could be obtained by annealing in a transverse field of 35 oersteds for 10 minutes at 300° C., and then quickly cooling the film in a transverse field. FIGURES 4*a* and 4*b* show the B-H loops before and after annealing in the transverse field. It is understood that if the unsaturated transverse axis loop of the B-H hysteresis loop is extended to the saturation value of B, the H coordinate of the intercept point is $H_k$, the anisotropy field. As viewed in FIG. 4*b* a value of $H_k$ of 0.8 oersteds for a film 1/16" to 1/2" in diameter and 3000 to 4000 angstroms thick may be obtained in this manner.

An example of the procedure used in the present invention is as follows: A specimen composed of 81 percent nickel and 19 percent iron, 1/16 of an inch to 1/2 of an inch in diameter and 3000 to 4000 angstroms thick is prepared by the deposition process described above. The film 40 on its substrate 45 is placed in the Vycor chamber 20 which is then evacuated by the vacuum pump 60. The valve 22*a* on source 22 is opened and a mixture of 97.5 argon and 2.5 hydrogen gas enters the tapered end 20*a* of the tube 20 and is allowed to flow through the tube at a pressure slightly above atmospheric. The valve 61 is opened to a position to allow venting. The zone of the tube surrounded by the heater 34, hereafter referred to as the hot zone, is raised to a temperature of 300° C.; this temperature is monitored by the thermocouple 26. The film 40, which has been at room temperature in the zone adjacent the hot zone, hereafter referred to the could zone, is then quickly inserted into the hot zone for a period of 10 minutes. After this annealing period the film is quickly withdrawn from the hot zone and is quenched to room temperature in the cold zone; the insertion and withdrawal being accomplished by a glass rod of Pyrex or the like, not shown. The entire process takes place in a constant magnetic field, of 35 oersteds along the transverse axis of the film 40, this field being produced by the pair of Helmholtz coils 50.

Referring again to FIGS. 4*a* and 4*b*, there is shown the effect of the anneal on the shape of the hysteresis loop of a typical desposited film. FIGURE 4*a* illustrates the shape of the loop before the material was annealed as observed in the easy and transverse directions, respectively. FIGURE 4*b* shows the corresponding loop of waveforms as observed after the film was annealed. It can be seen immediately that there is no observable change in the shape of the hysteresis loop in the easy direction when the annealing field is oriented in the transverse direction during the heat treatment. There is, however, an appreciable change in the shape of the loop in the transverse direction as a result of the annealing process. In this case, $H_k$ the value for the anisotropy field, was reduced from 3.1 to 0.8 oersteds as viewed in FIGS. 4*a* and 4*b*, respectively.

Since the anisotropy field i.e., the field required to rotate the magnetization from the easy to the hard direction, has been significantly reduced by reason of the inventive process disclosed herein and since the current required to drive or switch a film is proportional to the anisotropy field ($H_k$) of the film, it is seen that the present invention results in improved performance with an expenditure of less power thereby readily adapting the newly processed magnetic film for digital computer information storage applications.

It will be understood that various changes in the details, materials, steps and arrangements of parts which have been herein described and illustrated in order to explain the nature of the invention may be made by those skilled in the art within the principle and scope of the invention as expressed in the appended claims.

What is claimed is:

1. The method of treating a thin magnetic film consisting essentially of an alloy of nickel and iron wherein the composition includes about 81 percent nickel, 19 percent iron, and wherein said film has preferred directions remanent magnetization lying along a certain magnetic axis thereof, said method comprising the steps of:
subjecting said film to a temperature in the range of between about 250° C. and 350° C. for an annealing period of 5 to 15 minutes;
quenching said film to room temperature at the expiration of said annealing period; and
subjecting said film to a magnetic field oriented substantially transversely to said certain magnetic axis while said film is maintained at the said temperature range.

2. The method of claim 1 being particularly characterized in that said film is subjected to said temperature range for an annealing period of about 10 minutes.

3. A uniaxial magnetic film of an alloy consisting essentially of 81 percent nickel and 19 percent iron and having a diameter in the range of 1/16 to 1/2 inch and a thickness in the range of 3000 to 4000 angstroms, said film being characterized by an anisotropy field of about 0.8 oersted, said film having been treated according to process of claim 1.

4. The method of treating an evaporatively deposited thin film of magnetic material arranged along the surface of a substrate, said film consisting essentially of an alloy of nickel and iron wherein the composition includes about 81 percent nickel, 19 percent iron, wherein said film has preferred directions of remanent magnetization lying along a certain magnetic axis thereof, and wherein said film is in the order of 1/16 inch in diameter and 3000 angstrom units in thickness comprising the steps of:
placing said film in a substantially nonoxidizing environment of 97.5 percent argon and 2.5 percent hydrogen, subjecting said film to a temperature in the range of between about 250° C. and 350° C.,
subjecting said film to said temperature range for an annealing period of about 10 minutes,
quenching said film to room temperature after the expiration of said annealing period,
subjecting said film during the entire process to a constant magnetic field of approximately 35 oersteds oriented substantially transversely to said certain magnetic axis.

References Cited

UNITED STATES PATENTS 3,039,891 6/1962 Mitchell -------- 148—108 XR
3,117,896 1/1964 Chu et al. --------- 148—108

L. DEWAYNE RUTLEDGE, *Primary Examiner.*

P. WEINSTEIN, *Assistant Examiner.*